(12) United States Patent
Inaba et al.

(10) Patent No.: US 6,738,549 B2
(45) Date of Patent: May 18, 2004

(54) POLARIZATION MAINTAINING OPTICAL FIBER AND PRODUCTION METHOD FOR POLARIZATION MAINTAINING OPTICAL FIBER PREFORM

(75) Inventors: Tadayuki Inaba, Sakura (JP); Shigeru Emori, Sakura (JP); Naoki Shamoto, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 43 days.

(21) Appl. No.: 10/091,924

(22) Filed: Mar. 5, 2002

(65) Prior Publication Data

US 2002/0141717 A1 Oct. 3, 2002

(30) Foreign Application Priority Data

Mar. 29, 2001 (JP) .................................. P2001-095131

(51) Int. Cl.$^7$ ................................................ G02B 6/16
(52) U.S. Cl. .................... 385/123; 385/11; 385/126; 65/411
(58) Field of Search ................. 385/123, 126, 385/127, 142, 11, 43, 49; 65/403, 411, 412, 435

(56) References Cited

U.S. PATENT DOCUMENTS 5,692,082 A * 11/1997 Fukushima ............. 385/88
6,463,195 B1 * 10/2002 Sasaki et al. ............. 385/43

FOREIGN PATENT DOCUMENTS

| EP | 0 598 349 A2 | 5/1994 |
| EP | 0 630 864 A2 | 12/1994 |
| JP | 58-145631 | 8/1983 |
| JP | 59-92929 | 5/1984 |
| JP | 63-194207 | 8/1988 |

OTHER PUBLICATIONS

Kikuchi, Y., et al., "Development of Polarization Maintaining Optical Fibers," Fujikura Technical Review, No. 16, Apr. 1987, pp. 1–12.

Kikuchi, Y., et al., "Splicing Characteristics of Polarization Maintaining Optical Fibers," IOOC '89 Technical Digest, Seventh International Conference on Integrated Optics and Optical Fiber Communication, International Conference Center Kobe and Portopia Hotel, Kobe, Japan, Jul. 18–21, 1989, pp. 68–69.

Tajima, K., et al., "Transmission Loss of a 125–$\mu$m Diameter PANDA Fiber with Circular Stress–Applying Parts," Journal of Lightwave Technology, IEEE, vol. 7, No. 4, New York, US, Apr. 11, 1989, pp. 674–679.

Taya, H., et al., "Fusion Splicer for Polarization Maintaining Single Mode Fiber," Fijikura Technical Review, No. 19, Jan. 1990, pp. 31–36.

Kobayashi, M., et al., "Optical–Frequency Encoder Using Polarization–Mainting Fiber," Journal of Lightwave Technology, vol. 8 No. 11, Nov. 1990, pp. 1697–1702.

Kersey, A., et al., "Polarimetric optical–fiber sensor with self–referencing interrogation," Washington, D.C., OFC '91/Wednesday, Feb. 20, 1991, p. 132.

* cited by examiner

Primary Examiner—Phan T. H. Palmer
(74) Attorney, Agent, or Firm—Bell, Boyd & Lloyd LLC

(57) ABSTRACT

The present invention provides a polarization maintaining optical fiber of which polarization crosstalk characteristic is not deteriorated after fusing two or more polarization maintaining optical fibers, and provides a method for producing a preform thereof. The polarization maintaining optical fiber includes two stress applying portions disposed in a cladding around a core, in which an angle formed by a line connecting the center of one of the stress applying portions with the center of the core and a line connecting the center of the other stress applying portion with the center of the core is 3 degrees or less. The preform is produced by forming one insertion hole in a cladding element and then rotating the preform 180 degrees around a core element without moving the drilling tool, followed by forming the other insertion hole in the cladding element and then inserting stress applying elements into the insertion holes.

9 Claims, 7 Drawing Sheets

POLARIZATION MAINTAINING OPTICAL FIBER AND PRODUCTION METHOD FOR POLARIZATION MAINTAINING OPTICAL FIBER PREFORM

BACKGROUND OF THE INVENTION

1. Field of the Invention

This invention relates to a polarization maintaining optical fiber which is useful in the field of communication or in the field of sensors using optical fibers, and relates to a method for producing an optical fiber preform for producing optical fibers.

2. Description of Related Art

There are various types of the polarization maintaining optical fibers, among which a stress applied type polarization maintaining optical fiber including a stress applying portion in a cladding portion are well known. Specific examples of the stress applied type polarization maintaining optical fiber includes a PANDA type polarization maintaining optical fiber, a bow-tie type polarization maintaining optical fiber, an elliptical jacket type polarization maintaining optical fiber, and the like, of which respective cross-sectional shapes are different from each other. Among these types, the PANDA type polarization maintaining optical fiber has been widely used because it has a low transmission loss and superior polarization maintaining characteristics.

FIG. 5 shows a conventional PANDA type polarization maintaining optical fiber according to a prior art. The polarization maintaining optical fiber 4 includes a core 1 having a high refractive index, a cladding 2 having a low refractive index and disposed around the core 1 so as to be concentric with the core 1, and two stress applying portions 3 and 3 having a circular cross-sectional shape and a refractive index generally lower than that of the cladding 2 and disposed in the cladding 2 so as to be symmetrical with respect to the core 1.

The stress applying portion 3 is produced from a material having a relatively large coefficient of thermal expansion. Therefore, when the polarization maintaining optical fiber 4 is produced by melting and drawing an optical fiber preform, the core 1 is subjected to different degrees of stress from transverse and longitudinal directions during glassification, as a result of which large distortions are anisotropically generated in the core 1, which causes birefringence in the polarization maintaining optical fiber 4.

In order to produce the polarization maintaining optical fiber 4, an optical fiber preform 14 including a core element 11 for producing the core 1 and a cladding element 12 for producing the cladding 2, which are shown in FIG. 6, are prepared. Then, a pair of insertion holes is formed in the cladding element 12 so as to be symmetrical with respect to the core element 11 and to pierce through the optical fiber preform 14 in the longitudinal direction, into which stress applying elements for producing the stress applying portions 3 are inserted. Then, the optical fiber preform 14 is melted and is drawn to produce the polarization maintaining optical fiber 4 shown in FIG. 5.

The insertion holes for disposing the stress applying elements in the cladding element 12 are conventionally formed by forming one insertion hole 13a by means of a drilling tool 16 such as a drill or a grindstone, followed by forming the other insertion hole 13b after parallelly transferring the drilling tool 16 to the position symmetrical with respect to the core element 11 in which the insertion hole 13b is formed, as shown in FIG. 6.

As shown in FIG. 7, when the insertion hole 13a is formed in a position slightly vertically off the transferring direction of the drilling tool 16, the insertion holes 13a and 13b and the core element 11 are not arranged in a line. An angle A is thereby formed by a line connecting the center of the insertion hole 13a with the center of the core element 11 and a line connecting the center of the insertion hole 13b with the center of the core element 11 (which is referred to as "angle disparity", hereinafter).

When the optical fiber preform 14 is melted and is drawn while having the angle disparity, the produced polarization maintaining optical fiber 4 also has the angle disparity.

When two polarization maintaining optical fibers 4 and 4 are fused after adjusting end faces thereof or after arranging in a line, a controlling step in which the polarization maintaining optical fiber 4 is circumferentially rotated is required so as to suppress deterioration of polarization crosstalk characteristic of the fused polarization maintaining optical fiber. In the controlling step, one of two polarization maintaining optical fibers is circumferentially rotated until each position of the core and the stress applying portions of the polarization maintaining optical fiber is adjusted to each position of the core and the stress applying portions of the other polarization maintaining optical fiber while observing the polarization maintaining optical fibers from their side. Hereinafter, the controlling step is referred to as a step of "polarization axis matching". At this time, it is required that the stress applying portions and the core be arranged in a line so as to carry out the polarization axis matching without deteriorating the polarization crosstalk characteristic. However, since the polarization maintaining optical fiber produced by the conventional method has the angle disparity, the polarization crosstalk characteristic is deteriorated after fusing at least two polarization maintaining optical fibers.

SUMMARY OF THE INVENTION

An object of the present invention is to provide a polarization maintaining optical fiber in which deterioration of polarization crosstalk characteristic is suppressed after fusing at least two polarization maintaining optical fibers and to provide a method of producing a polarization maintaining optical fiber preform used for producing the polarization maintaining optical fiber.

The present invention provides a polarization maintaining optical fiber comprising: a core; a cladding disposed around the core; and two stress applying portions disposed in the cladding to be approximately symmetrical with respect to the core, wherein an angle formed by a line connecting the center of one of the stress applying portions with the center of the core and a line connecting the center of the other stress applying portion with the center of the core is 3 degrees or less.

Moreover, the present invention provides a polarization maintaining optical fiber preform comprising: a core element; a cladding element disposed around the core element; and two stress applying elements disposed in the cladding element to be approximately symmetrical with respect to the core element, which is produced by forming an optical fiber preform including the core element and the cladding element, forming one insertion hole in the cladding element so as to pierce through the cladding element in parallel to the core element, and then rotating the optical fiber preform further including the insertion hole 180 degrees around the core element, followed by forming the other insertion hole in the cladding element so as to pierce through the cladding element in parallel to the core element, and then inserting the stress applying elements into the insertion holes.

The aforementioned polarization maintaining optical fiber may be produced from the aforementioned polarization maintaining optical fiber preform.

Moreover, the present invention provides a method of producing a polarization maintaining optical fiber preform including a core element, a cladding element disposed around the core element, and two stress applying elements disposed in the cladding element to be approximately symmetrical with respect to the core element, comprising: a step of forming an optical fiber preform including the core element and the cladding element; a step of forming one insertion hole in the cladding element so as to pierce through the cladding element in parallel to the core element; a step of rotating the optical fiber preform further including the insertion hole 180 degrees around the core element; a step of forming the other insertion hole in the cladding element so as to pierce through the cladding element in parallel to the core element; and a step of inserting the stress applying elements into the insertion holes.

Moreover, the present invention provides a method of producing a polarization maintaining optical fiber comprising a step of melting and drawing the aforementioned polarization maintaining optical fiber preform.

DETAILED DESCRIPTION OF THE INVENTION

In the following, the present invention will be explained in detail.

Figure 1:
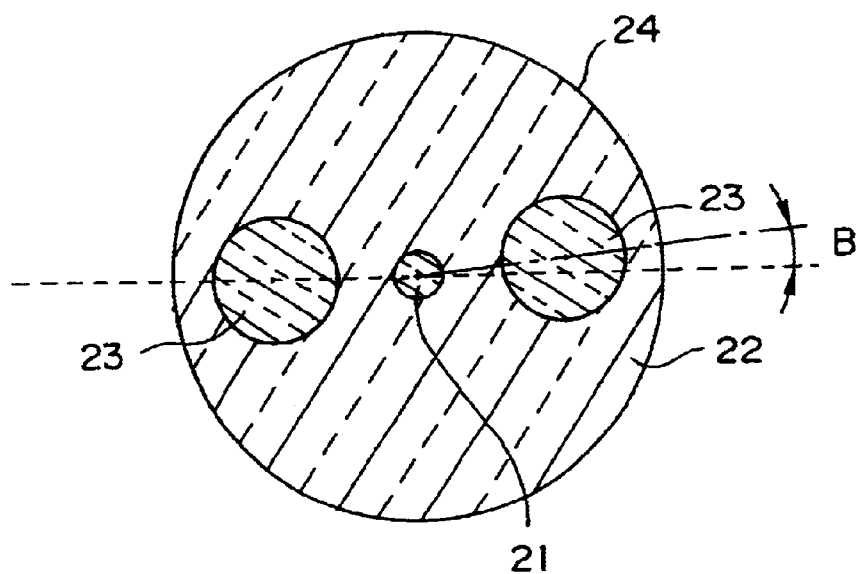
FIG. 1 is a cross-sectional view showing one embodiment of a polarization maintaining optical fiber according to the present invention.
Figure 5:
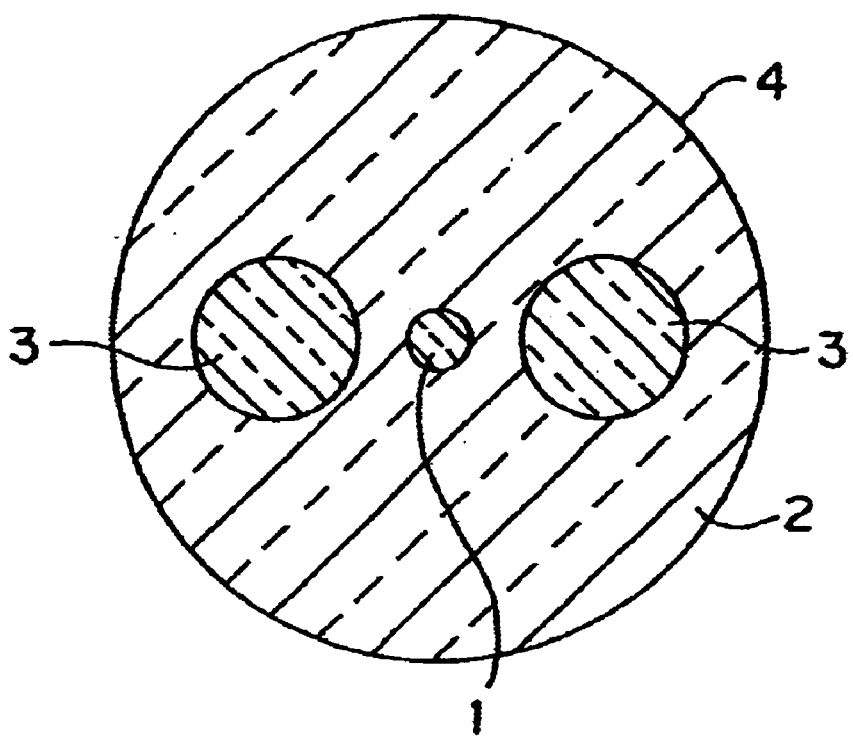
FIG. 5 is a cross-sectional view showing a conventional polarization maintaining optical fiber.
Figure 6:
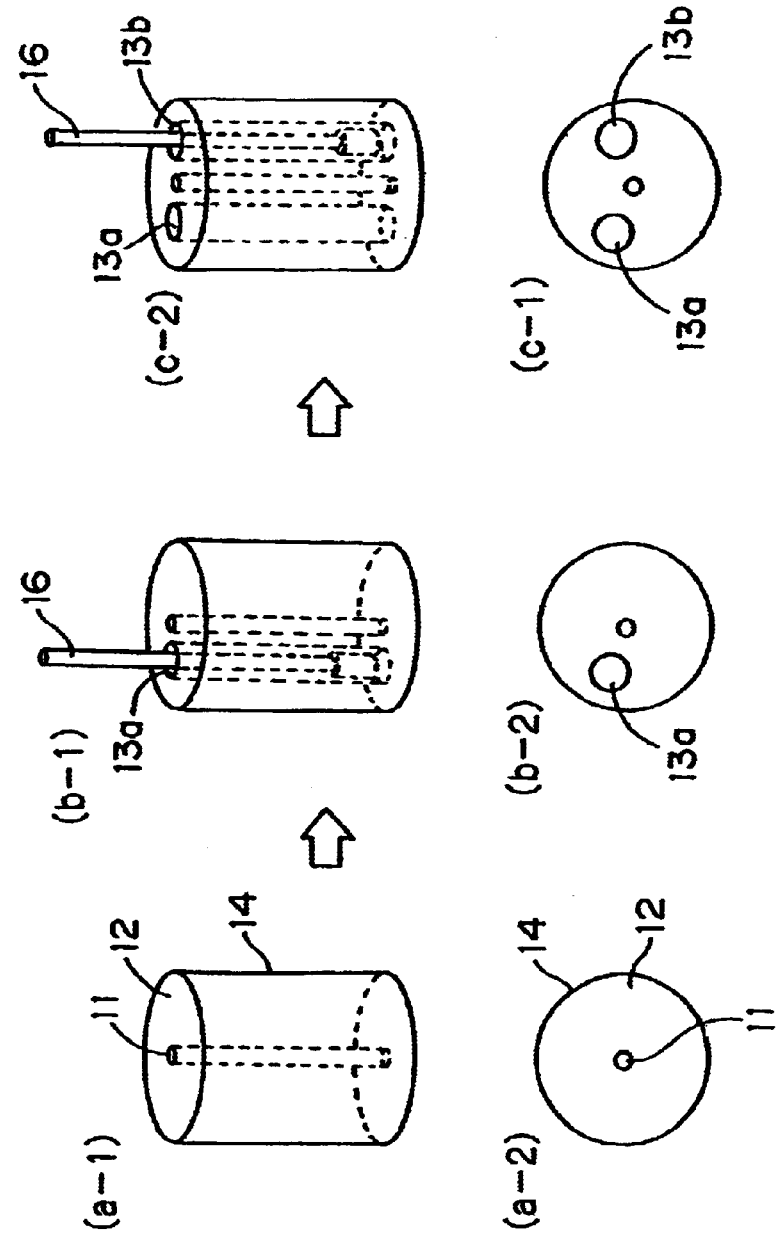
FIG. 6 is a schematic diagram showing a conventional step of forming insertion holes in an optical fiber preform for producing a conventional polarization maintaining optical fiber.
Figure 7:
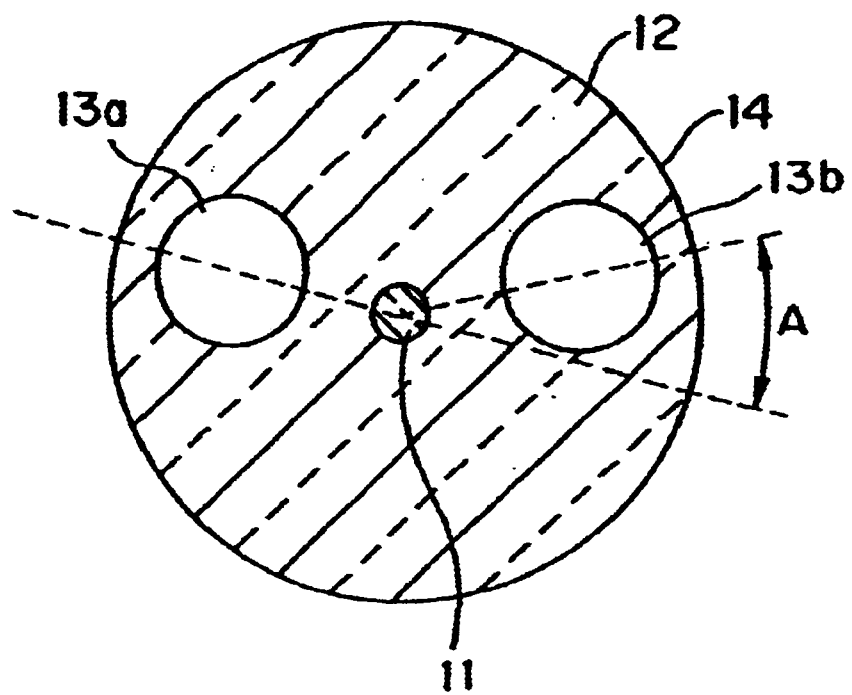
FIG. 7 is a schematic diagram showing the angle disparity of insertion holes produced by a conventional method for producing an optical fiber preform.

FIG. 1 shows a polarization maintaining optical fiber 24 according to one embodiment of the present invention. The polarization maintaining optical fiber 24 includes a core 21, a cladding 22, and stress applying portions 23. The polarization maintaining optical fiber 24 may be produced from materials used for producing the conventional polarization maintaining optical fiber 4 shown in FIG. 5. Specifically, the core 21 is produced from quartz glass doped with germanium dioxide ($GeO_2$), the cladding 22 is produced from quartz glass suitably doped with fluorine (F), and the stress applying portions 23 are produced from quartz glass doped with a relatively large amount of boron oxide ($B_2O_3$).

The cladding 22 is disposed around the core 21, and the stress applying portions 23 are disposed in the cladding 22 to be approximately symmetrical with respect to the core 21.

In the polarization maintaining optical fiber 24, an angle disparity B formed by a line connecting the center of one of the stress applying portions 23 with the center of the core 21 and a line connecting the center of the other of the stress applying portions 23 with the center of the core 21 is 3 degrees or less, preferably 1.7 degrees. When the angle disparity B is more than 3 degrees, the polarization axis matching cannot be carried out with precision when two or more polarization maintaining optical fibers are fused. As a result, the deterioration of polarization crosstalk characteristic of the fused polarization maintaining optical fiber increases.

The polarization crosstalk characteristic of the fused polarization maintaining optical fibers is preferably −25 dB or less, and more preferably −30 dB or less. When the angle disparity B is 3 degrees or less, the polarization crosstalk characteristic of the fused polarization maintaining optical fibers is −25 dB or less, which is preferable.

Thus, since the angle disparity B of the polarization maintaining optical fiber 24 is 3 degrees or less, and both of the stress applying portions 23 and the core 21 are roughly arranged in a line, the polarization axis matching can be carried out with precision, and the deterioration of the polarization crosstalk characteristic after fusing two or more polarization maintaining optical fibers can be decreased.

The outer diameter of the stress applying portion 23, the refractive index differences of the core 21 relatively to the cladding 22, and the relative refractive index difference of the stress applying portion 23 relatively to the cladding 22 are suitably determined in accordance with desirable characteristics. The mode field diameter of the core 21 is preferably 3 to 12 µm, more preferably 5 to 10 µm, and the outer diameter of the cladding 22 is preferably 123 to 127 µm, more preferably approximately 125 µm.

Figure 2:
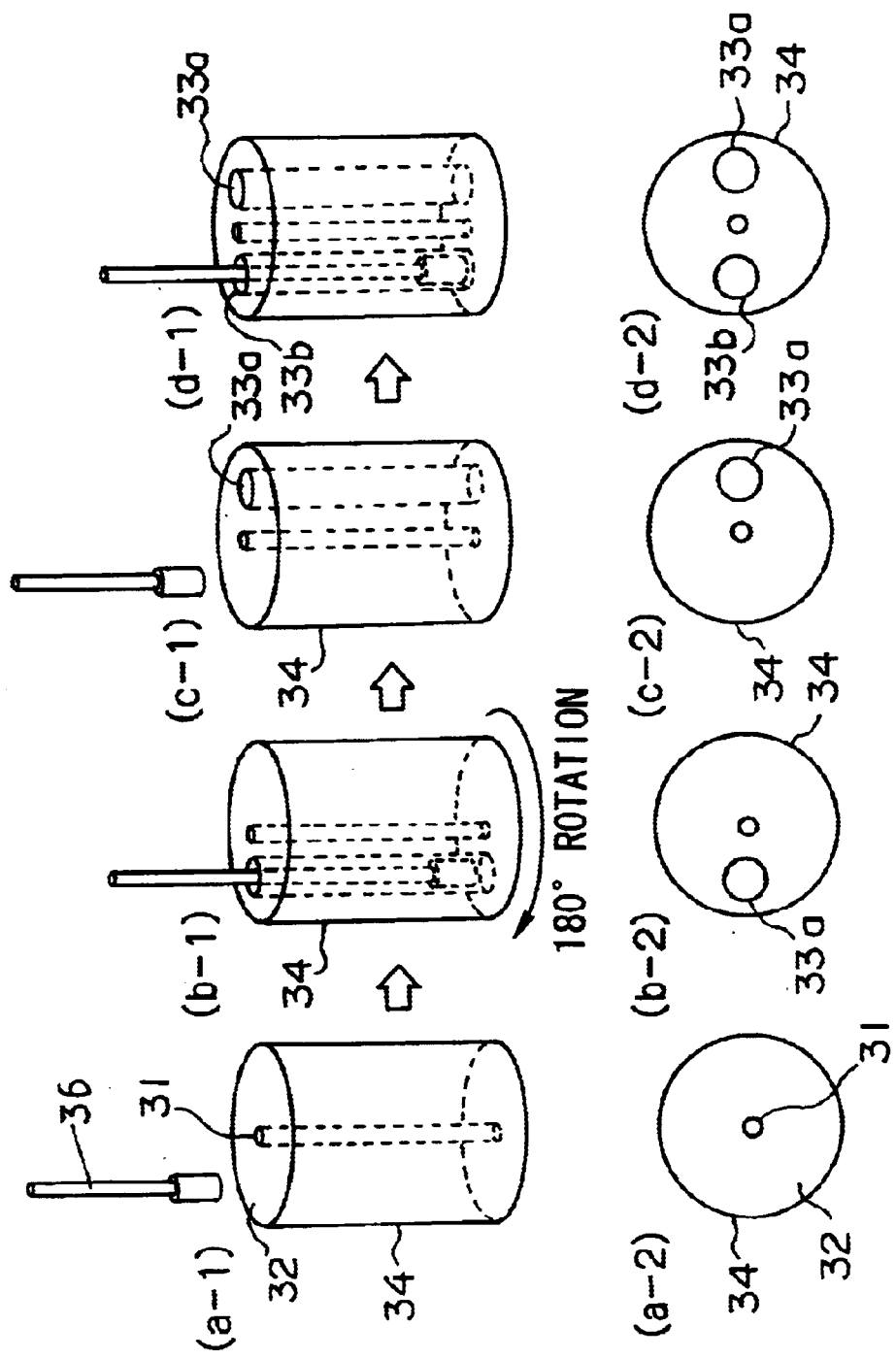
FIG. 2 is a schematic diagram showing one embodiment of a step of forming insertion holes in an optical fiber preform for producing a polarization maintaining optical fiber according to the present invention.

The polarization maintaining optical fiber 24 can be produced by melting and drawing a polarization maintaining optical fiber preform 34 including a core element 31 for forming the core 21, a cladding element 32 for forming the cladding 22, and stress applying elements for forming stress applying portions 23, which are shown in FIG. 2. The cladding element 32 is disposed around the core element 31, and the stress applying elements are disposed in the cladding element 32 to be approximately symmetrical with respect to the core element 31.

The core element 31 and the cladding element 32 are formed by a conventional method such as a VAD method, an MCVD method, a PCVD method, or the like. Then, the stress applying elements are formed in the cladding element 32 by inserting the stress applying elements into insertion holes 33a and 33b, as shown in FIG. 2.

FIG. 2 illustrates steps of forming the insertion holes in the cladding element 32, into which the stress applying elements are inserted to be approximately symmetrical with respect to the core element 31. In FIG. 2, after an optical fiber preform including the core element 31 and the cladding element 32 is held by means of a holder or the like, the insertion hole 33a is formed in the cladding element 32 so as to pierce through the cladding element 32 parallelly to the core element 31 in the longitudinal direction by means of a drilling tool 36 such as a drill or a grindstone. Instead of parallelly transferring the drilling tool 36 to the position in which the other insertion hole 33b is formed, the optical fiber preform further including the insertion hole 33a is circumferentially rotated 180 degrees while holding the optical fiber preform by means of the holder and without moving the drilling tool 36. Then, the insertion hole 33b is formed in the cladding element 32 so as to pierce through the cladding element 32 in the longitudinal direction parallelly to the core element 31 by means of the drilling tool 36. At this time, the angle disparity formed by a line connecting the center of the insertion hole 33a with the center of the core element 31 and a line connecting the center of the insertion hole 33b with the center of the core element 31 is 3 degrees or less. Thus, the insertion holes 33a and 33b are formed to be approximately symmetrical with respect to the core element 31. Then, the stress applying elements are inserted into the insertion holes 33a and 33b to produce the polarization maintaining optical fiber preform 34.

According to the aforementioned method for producing the polarization maintaining optical fiber preform 34, since the position at which the insertion hole 33b is formed is decided by rotating the optical fiber preform including the core element, the cladding element, and the insertion hole 33a 180 degrees around the core element without moving the drilling tool 36, the insertion hole 33b can be formed without generating the difference between vertical positions of the insertion holes 33a and 33b, which can prevent the generation of the angle disparity.

Figure 3:
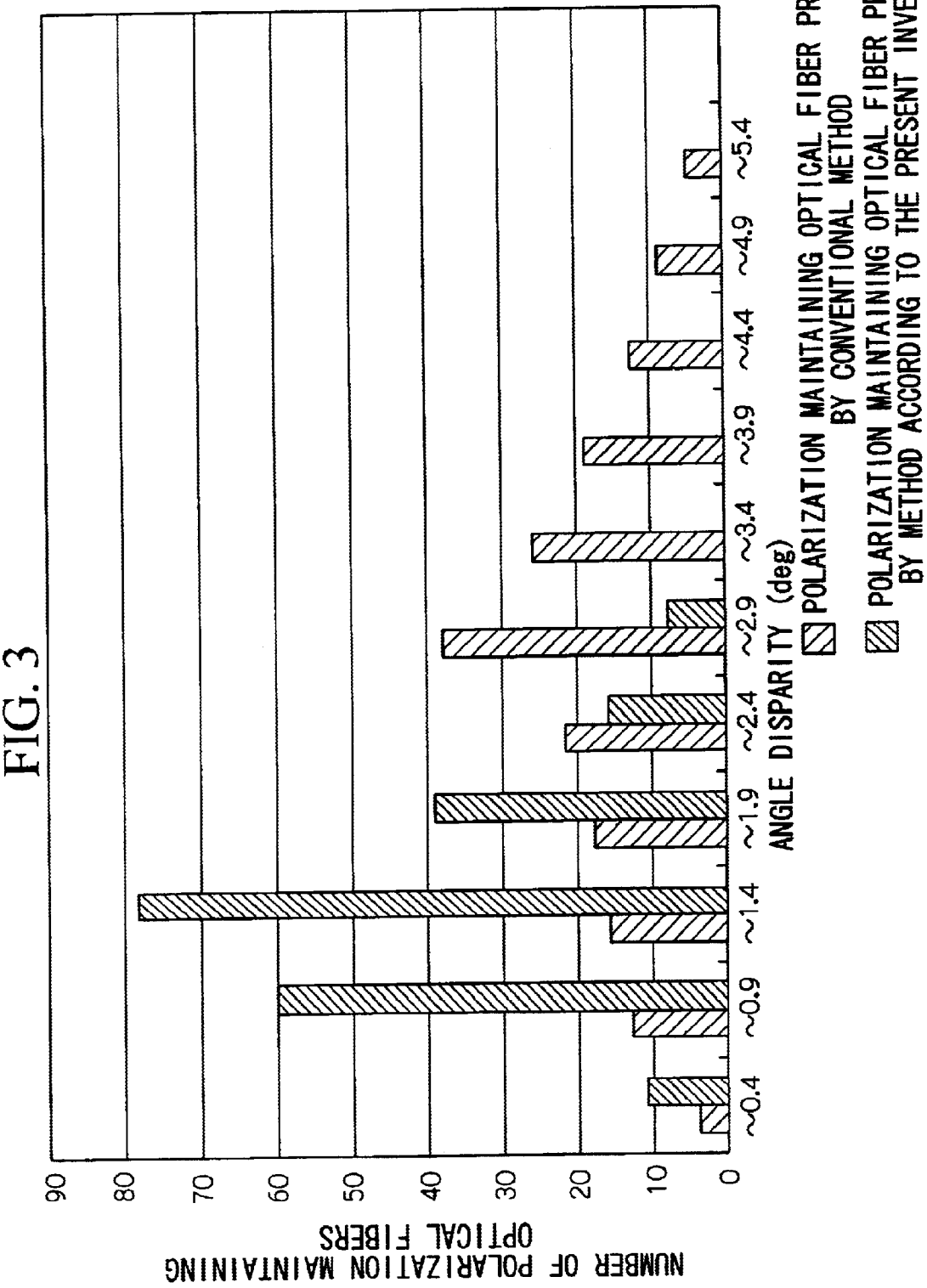
FIG. 3 is a graph showing the distribution of the angle disparity of polarization maintaining optical fibers each produced by melting and drawing an optical fiber preform produced by a conventional method or by a method according to the present invention.

FIG. 3 is a graph showing the distribution of the angle disparities of 200 polarization maintaining optical fibers produced by the method according to the present invention and of the angle disparities of 200 polarization maintaining optical fibers produced by the conventional method. As shown in FIG. 3, when the polarization maintaining optical fibers were produced by the method according to the present invention, the maximum value of the angle disparities was 3 degrees and the average value of the angle disparities was 1.5 degrees. In contrast, when the polarization maintaining optical fibers were produced by the conventional method, the maximum value was 5 degrees and the average value was 3 degrees, both of which were larger than those of the polarization maintaining optical fibers produced by the method according to the present invention.

Although the polarization maintaining optical fiber 24 described above is the PANDA type polarization maintaining optical fiber, the polarization maintaining optical fiber according to the present invention may be the bow-tie type polarization maintaining optical fiber, or the like, having two stress applying portions disposed to be approximately symmetrical with respect to a core thereof.

In the following, a specific relationship between the angle disparity and the polarization crosstalk characteristic will be explained.

Polarization maintaining optical fibers having various angle disparities were produced. Each of the polarization maintaining optical fibers was cut into pieces each of the same length. After polarization axes of the pieces were matched, end faces of the pieces were arranged to be fused with each other. Then, each of the polarization crosstalk characteristic was measured five times by the following method. Specifically, a light source was put at one end of the polarization maintaining optical fiber, and a polarizer was disposed therebetween. A detector was put at the other end of the polarization maintaining optical fiber, and an analyzer was disposed therebetween. One of two polarization axes of the polarization maintaining optical fiber was made to coincide with the polarization axis of the polarizer. After cutting the polarization maintaining optical fiber into pieces and then fusing the pieces, the light power $P_h$ of incident light entering from the light source into the polarization maintaining optical fiber was measured. Then, the analyzer was rotated by 90 degrees, followed by measuring the light power $P_v$. The polarization crosstalk characteristic was calculated from the ratio of the light power $P_v$ to the light power $P_h$, in accordance with the following formula:

$$CT=10\ \mathrm{Log}(P_v/P_h).$$

Figure 4:
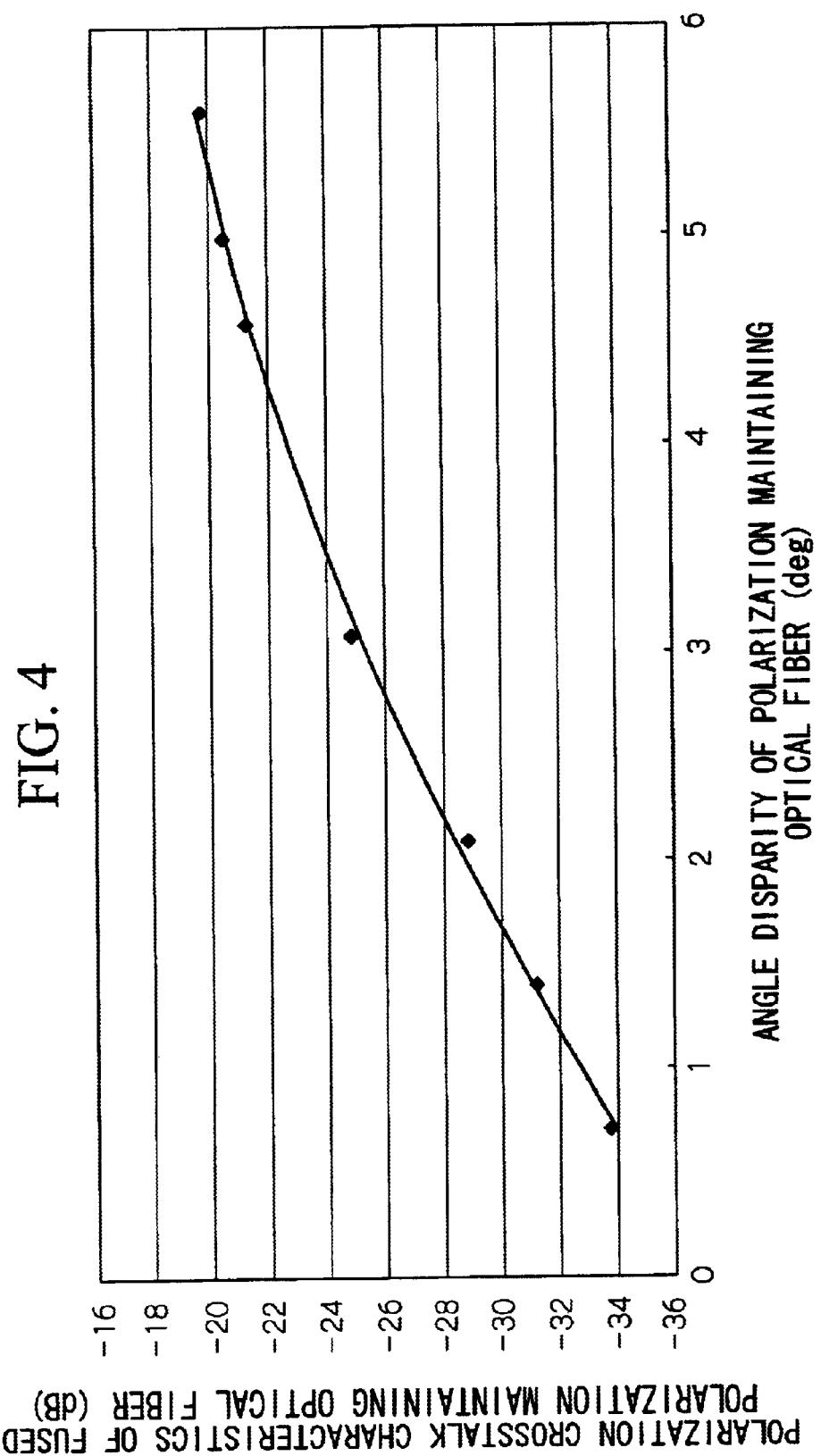
FIG. 4 is a graph showing the relationship between the angle disparity of a polarization maintaining optical fiber and polarization crosstalk characteristic of the polarization maintaining optical fiber fused to another polarization maintaining optical fiber having the same angle disparity.

FIG. 4 is a graph showing the obtained results. In FIG. 4, the vertical axis of the graph shows the worst value of the polarization crosstalk characteristic among five measured values for each fused polarization maintaining optical fiber. The horizontal axis of the graph shows the angle disparity of each fused polarization maintaining optical fiber. As shown in FIG. 4, the polarization crosstalk characteristic was deteriorated as the angle disparity increased. When the angle disparity was approximately 3 degrees, the polarization crosstalk characteristic of the fused polarization maintaining optical fibers was −25 dB.

As described above, since the angle disparity of the polarization maintaining optical fiber is 3 degrees or less, the polarization axis matching between two or more polarization maintaining optical fibers can be carried out with high precision, and the polarization crosstalk characteristic after fusing two or more polarization maintaining optical fibers can be suppressed to be −25 dB or less.

Moreover, by rotating the preform 180 degrees around the core element without moving the drilling tool after forming one insertion hole in the cladding element in order to decide the position in which the other insertion hole is formed, the insertion holes can be formed in a line with the decreased angle disparity, which prevents the crosstalk deterioration after fusing two or more polarization maintaining optical fibers.

What is claimed is:

1. A polarization maintaining optical fiber preform comprising:

a core element;

a cladding element disposed around the core element; and two stress applying elements disposed in the cladding element to be approximately symmetrical with respect to the core element;

the preform formed by forming one insertion hole in the cladding element so as to pierce through the cladding element in parallel to the core element, subsequently rotating the optical fiber preform further including the insertion hole 180 degrees around the core element, followed by forming the other insertion hole in the cladding element so as to pierce through the cladding element in parallel to the core element, and subsequently inserting the stress applying elements into the insertion holes.

2. A polarization maintaining optical fiber produced from the polarization maintaining optical fiber preform according to claim 1.

3. A polarization maintaining fiber according to claim 2, wherein an angle formed by a line connecting a center of one of stress applying portion with a center of the core and a line connecting a center of the other stress applying portion with the center of the core is 3 degrees or less.

4. A method of producing a polarization maintaining optical fiber perform including a core element, a cladding element disposed around the core element, and two stress applying elements disposed in the cladding element to be approximately symmetrical with respect to the core element, comprising:

a step of forming one insertion hold in the cladding element so as to pierce through the cladding element in parallel to the core element;

a step of rotating the optical fiber perform further including the insertion hole 180 degrees around the core element;

a step of forming the other insertion hole in the cladding element so as to pierce through the cladding element in parallel to the core element; and a step of inserting the stress applying elements into the insertion holes.

5. A method of producing a polarization maintaining optical fiber comprising:

a step of melting and drawing the polarization maintaining optical fiber preform produced by the method according to claim 4.

6. A method of producing a polarization maintaining optical fiber preform including a core element, a cladding element disposed around the core element, and two stress applying elements disposed in the cladding element to be approximately symmetrical with respect to the core element, comprising:

a step of forming one insertion hole in the cladding element so as to pierce through the cladding element in parallel to the core element;

a step of rotating the optical fiber preform further including the insertion hole 180 degrees around the core element;

a step of forming the other insertion hole in the cladding element so as to pierce through the cladding element in parallel to the core element; and a step of inserting the stress applying elements into the insertion holes;

whereby an angle formed by a line connecting a center of one of stress applying portion with a center of the core and a line connecting a center of the other stress applying portion with the center of the core is 3 degrees or less.

7. A method of producing a polarization maintaining optical fiber comprising:

a step of producing a polarization maintaining optical fiber preform by the method of claim 6; and a step of melting and drawing the polarization maintaining optical fiber preform to produce the polarization maintaining optical fiber.

8. A polarization maintaining optical fiber produced by the method of producing a polarization maintaining optical fiber according to claim 7.

9. A polarization maintaining optical fiber preform produce by the method of producing a polarization maintaining optical fiber preform according to claim 6.

* * * * *